No. 671,590. Patented Apr. 9, 1901.
G. GROS & M. D. BROWN.
AUTOMATIC MACHINE FOR TAPPING NUTS.
(Application filed Aug. 25, 1900.)
(No Model.) 3 Sheets—Sheet 2.
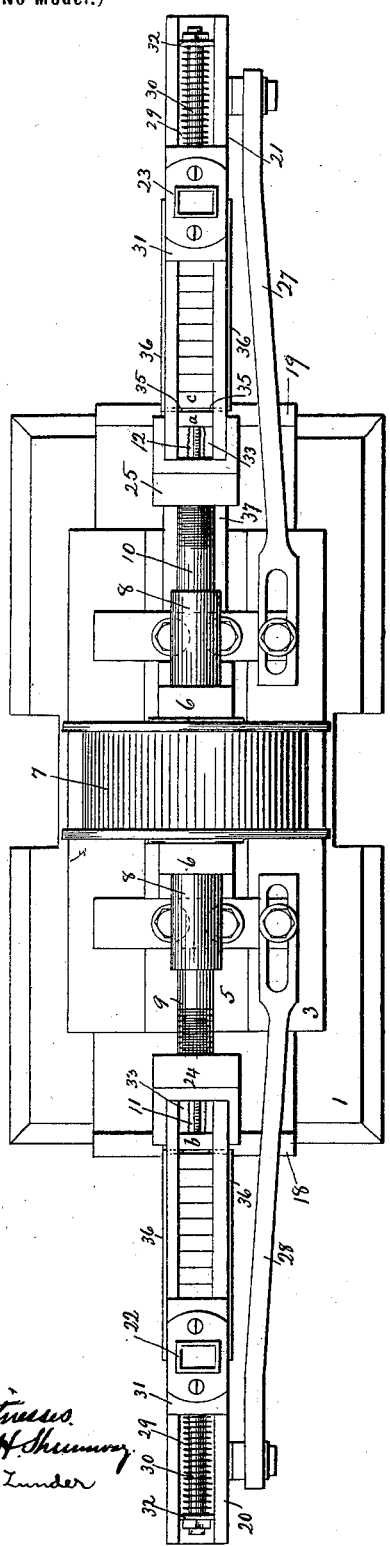
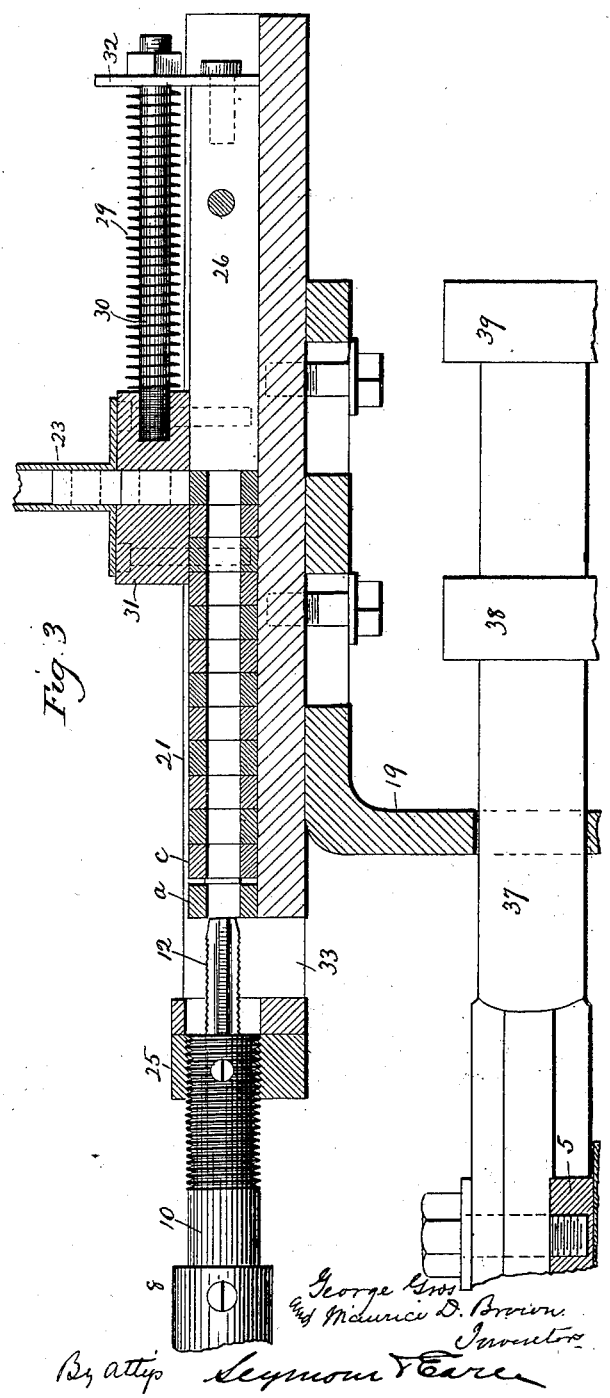

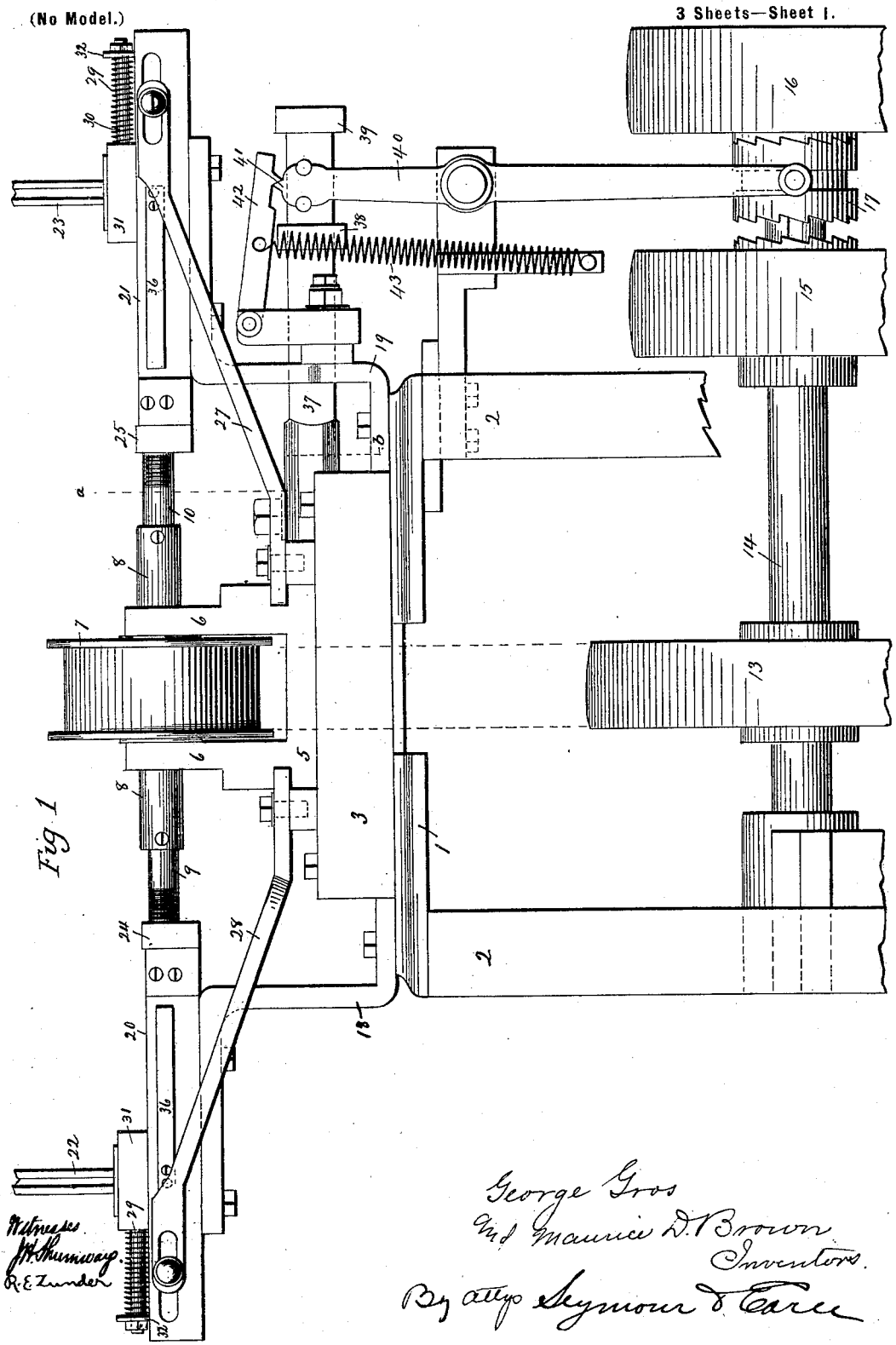

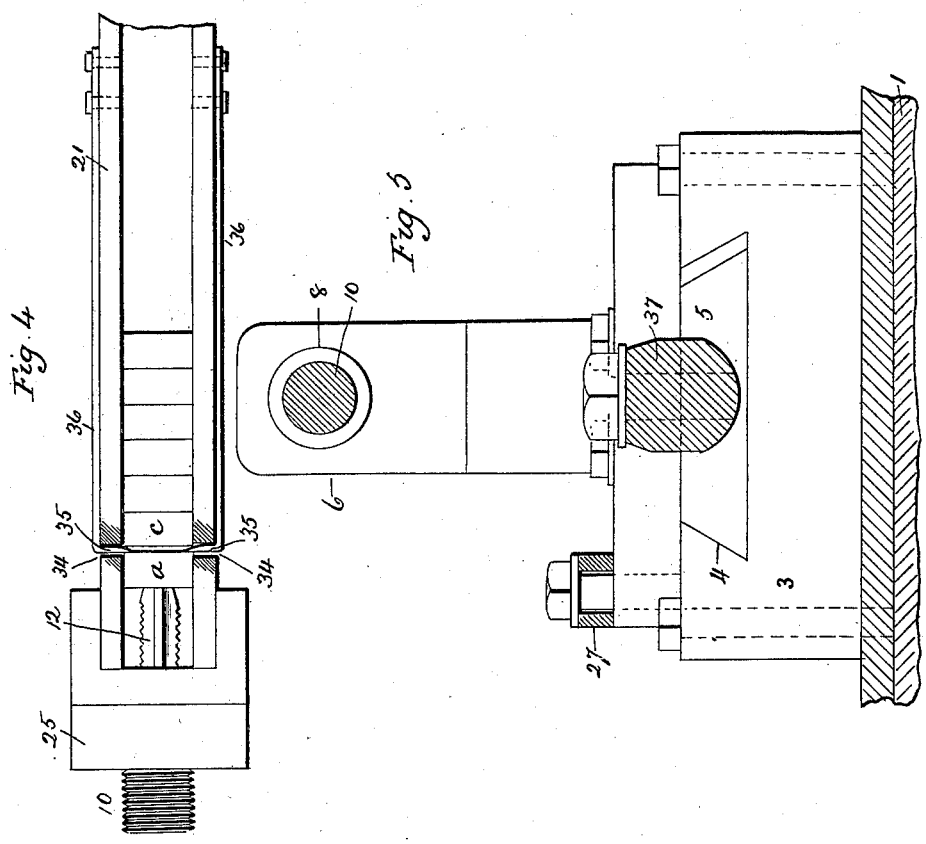

UNITED STATES PATENT OFFICE.

GEORGE GROS AND MAURICE D. BROWN, OF WATERBURY, CONNECTICUT.

AUTOMATIC MACHINE FOR TAPPING NUTS.

SPECIFICATION forming part of Letters Patent No. 671,590, dated April 9, 1901.

Application filed August 25, 1900. Serial No. 28,016. (No model.)

*To all whom it may concern:*

Be it known that we, GEORGE GROS and MAURICE D. BROWN, of Waterbury, in the county of New Haven and State of Connecticut, have invented a new Improvement in Automatic Machines for Tapping Nuts; and we do hereby declare the following, when taken in connection with the accompanying drawings and the letters of reference marked thereon, to be a full, clear, and exact description of the same, and which said drawings constitute part of this specification, and represent, in—

Figure 1, a side view of a machine constructed in accordance with our invention; Fig. 2, a top or plan view of the same; Fig. 3, an enlarged sectional view of one end of the machine; Fig. 4, a top or plan view, partially broken away, of one of the blank guides, illustrating the manner of supporting the blanks for tapping; Fig. 5, a sectional view on line $a\,b$ of Fig. 1 looking to the left.

This invention relates to an improvement in machines for tapping nuts, the object of the invention being the production of an automatic machine having two taps arranged oppositely to each other and so as to alternately operate on blanks presented to them, whereby after one tap has operated and started to withdraw the other tap will begin operations; and the invention consists in the construction and combination of parts, as will be hereinafter described.

Upon a bed-plate 1, suitably supported by legs 2, we arrange a bed-block 3, in the upper face of which is a longitudinal undercut groove 4, in which is mounted a slide 5. In bearings 6 6 on the slide 5 a belt-pulley 7 is mounted on an axle 8, into the opposite ends of which are inserted threaded spindles 9 10, the ends 11 12 of which are preferably reduced and formed with tap-threads. The pulley 7 is driven by a belt from a pulley 13 on a drive-shaft 14, arranged below the bed of the machine. On the said shaft 14 are also two loose pulleys 15 16, adapted to be driven in opposite directions, and between them is a clutch 17, keyed for revolution with the shaft, but adapted to slide into connection with either of the pulleys 15 or 16. Supported by brackets 18 19, secured to opposite ends of the bed-plate, are holders 20 21, into which nut-blanks are fed through chutes 22 23 from suitable hoppers. (Not shown.) At the inner end of each holder is a nut 24 25, suitably threaded to receive the spindles 9 10, and so that as the spindles are revolved one will be turned into its nut while the other is turned out of its nut, and hence the slide 5 will be reciprocated in the bed-block 3.

The guides 20 21 correspond in size to the size of the nuts to be threaded, and in the outer end of each is a plunger 26, clearly shown in Figs. 3 and 4. These plungers are adjustably connected with the slide 5 by links 27 28, so that they are reciprocated beneath the chutes 22 23, and they are held in their retired positions by springs 29, held in position by pins 30, mounted between the mouth 31 of the chutes and an arm 32, secured to the end of the plungers. In the bottom of each guide, at the inner end, is a clearance-opening 33 for the escape of the tapped nuts, and in each side of the guides is a hole 34, through which the ends 35 of spring-fingers 36 extend into the path of the column of blanks in the guides. These fingers are secured to the sides of the chute and yield outwardly as the column of blanks is forced against them by the plunger and when a blank has passed spring inward in rear of the blank to support it when it is tapped.

Secured to the slide 5 and projecting outward therefrom is an arm 37, on which stop-rings 38 39 are adjustably secured, and these rings are adapted to strike the upper end of a shifting-lever 40, the lower end of which is coupled with the clutch 17, so that as the upper end of the lever is turned the clutch will be alternately engaged with the pulleys 15 16. To hold the lever 40 in its respective positions we form its upper end with a rib 41, which is engaged by a dog 42 depressed by a spring 43.

The taps 11 12 may be formed integral with the threaded spindles 9 10 or may be formed independently and secured to the spindles, as indicated in broken lines, Fig. 3. The guides 20 21 may be made adjustable to accommodate various sizes of blanks, or separate guides may be employed for each size, as they may be easily adjusted to position.

The operation of the machine is as follows: The guides being filled with blanks and the pulley 16 engaged by the clutch 17, the shaft 14 will be revolved to turn the pulley 7, so as to rotate the spindle 10 and turn it into the nut 25 and the tap 12 into a blank a, which is supported by the ends 35 of the fingers 36. As the spindle 10 rotates the slide 5 is moved to the right, which allows the plunger 26 to move backward, so that its end clears the chute 23 and permits another blank to drop down, and at the end of the movement when the blank a is tapped the ring 38 on the arm 37 will strike the upper end of the shifting-lever 40 and throw that end to the right, the dog 42 yielding to permit it, which shifts the clutch 17 from the pulley 16 to the reversely-driven pulley 15. This movement reverses the direction of rotation of the pulley 7 and the spindles 9 10, which withdraws the tap 12 from the nut a and permits it to drop through the clearance-opening 33 at the same time the tap 11 is being turned into a blank b in the guide 20. As the slide moves to the left the plunger 26 is moved by the link 27 and the column of blanks in the guide is moved forward until the next blank c is forced beyond the points 35 of the fingers 36 and in position for threading. When the tap 11 has passed through the blank b, the ring 39 on the arm 37 will come into engagement with the upper end of the lever 40, shift that lever to throw the clutch into engagement with the pulley 16, and again reverse the machine and tap the next succeeding blank c, and thus the machine operates automatically to tap nuts at opposite ends, the movement to turn a tap into one blank acting to withdraw a tap from a threaded blank.

As usually arranged the machines will be timed to feed and tap one nut at a time; but it is evident that two or more nuts may be fed and tapped at each movement of the machine. Thus in tapping blanks of one-half the thickness shown two blanks could be fed and tapped without altering the adjustment of the machine. The size of the machines will of course be dependent upon the size of the blanks to be tapped.

Having thus described our invention, what we claim, and desire to secure by Letters Patent, is—

1. In a machine for tapping nuts, the combination with a reciprocating slide mounted between two fixed guides, of a rotatable spindle carried by said slide and engaging with nuts secured to said guides, and taps at the outer ends of said spindle and extending into said guides, substantially as described.

2. In a machine for tapping nuts, the combination with a reciprocating slide, of two fixed guides between which the slide is mounted, a nut at the inner end of each guide, two rotatable spindles carried by said slide and respectively engaging with said nuts, taps extending from the ends of the spindles into the guides, plungers in said guides, and links connecting said plungers with the slide, substantially as described.

3. In a machine for tapping nuts, the combination with a reciprocating slide, of two fixed guides between which the slide is mounted, a nut at the inner end of each guide, two rotatable spindles carried by said slide and respectively engaging with said nuts, taps extending from the ends of the spindles into the guides, plungers in said guides, links connecting said plungers with the slide, and spring-fingers arranged on opposite sides of the guides and having ends extending through openings in the sides of the guides, substantially as described.

4. In a machine for tapping nuts, the combination with a reciprocating slide mounted between two fixed guides, of two rotatable spindles carried by said slide and engaging with nuts secured to said guides, taps at the outer ends of said spindles and entering into the said guides, an arm extending outward from said slide, and a lever adapted to be engaged by said arm, whereby the direction of movement of the spindles may be reversed, substantially as described.

In testimony whereof we have signed this specification in the presence of two subscribing witnesses.

GEORGE GROS.
MAURICE D. BROWN.

Witnesses:
MAY A. SOMERS,
WM. H. LOWE.